United States Patent
Benkowski

[11] 3,972,571
[45] Aug. 3, 1976

[54] BOOM SLIDER ASSEMBLY

[75] Inventor: Frank J. Benkowski, Bedford, Ohio

[73] Assignee: The Warner & Swasey Company, Cleveland, Ohio

[22] Filed: July 9, 1975

[21] Appl. No.: 594,300

Related U.S. Application Data

[60] Continuation of Ser. No. 397,294, Sept. 14, 1973, abandoned, which is a division of Ser. No. 240,759, April 3, 1972, which is a continuation of Ser. No. 29,408, April 17, 1970, Pat. No. 3,782,790.

[52] U.S. Cl. .............................. 308/3 R; 212/55; 52/111; 52/115
[51] Int. Cl.² ........................................ F16C 17/00
[58] Field of Search.............. 308/3, 73, 160, 5 R; 212/55; 52/111, 115, 118

[56] References Cited
UNITED STATES PATENTS

| | | | |
|---|---|---|---|
| 3,259,251 | 7/1966 | Stauffer | 212/55 |
| 3,341,029 | 9/1967 | Barkley | 212/55 |
| 3,368,696 | 2/1968 | Johnson | 212/55 |
| 3,396,860 | 8/1968 | Witroer | 212/55 |

FOREIGN PATENTS OR APPLICATIONS

| | | | |
|---|---|---|---|
| 689,214 | 4/1965 | Italy | 308/3 R |

Primary Examiner—Charles J. Myhre
Assistant Examiner—R. H. Lazarus

[57] ABSTRACT

An improved boom includes a slider assembly for use in supporting telescoping sections of the boom for movement relative to each other. An articulated slider assembly embodying the invention includes a rocker member which is pivotally mounted on one section of the boom. A pair of slider block assemblies are pivotally mounted on the rocker member and slidably engage a supported section of the boom at spaced apart locations. Deflection of the supported boom section is compensated for by pivotal movement of the slider block assemblies relative to each other. A spring type slider assembly forms another embodiment of the invention and has a flexural rigidity such that the deflection of the spring type slider assembly matches the deflection of a supported section of the boom under the influence of an operating load to provide for the transmittal of a uniform bearing load between the supported boom section and slider assembly.

3 Claims, 15 Drawing Figures

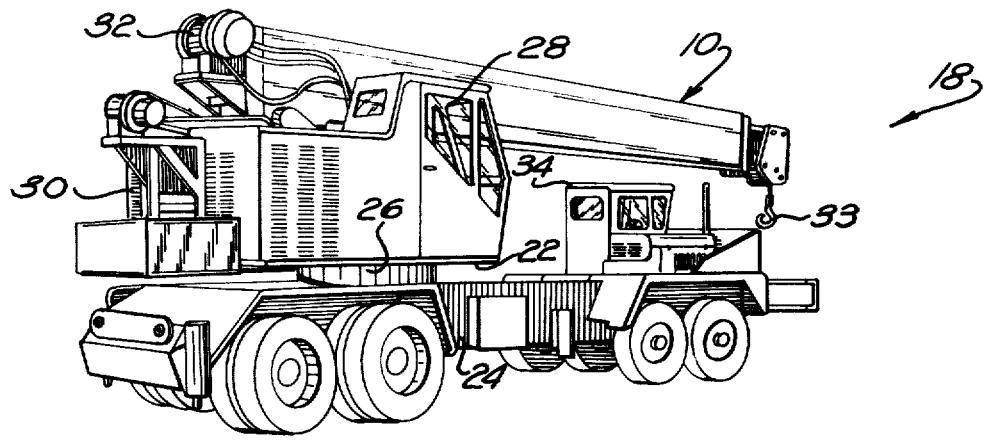
FIG. 1
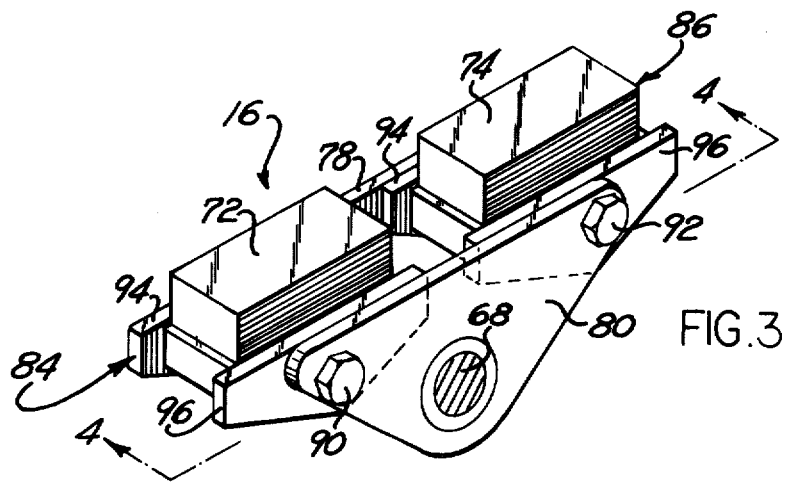
FIG. 3
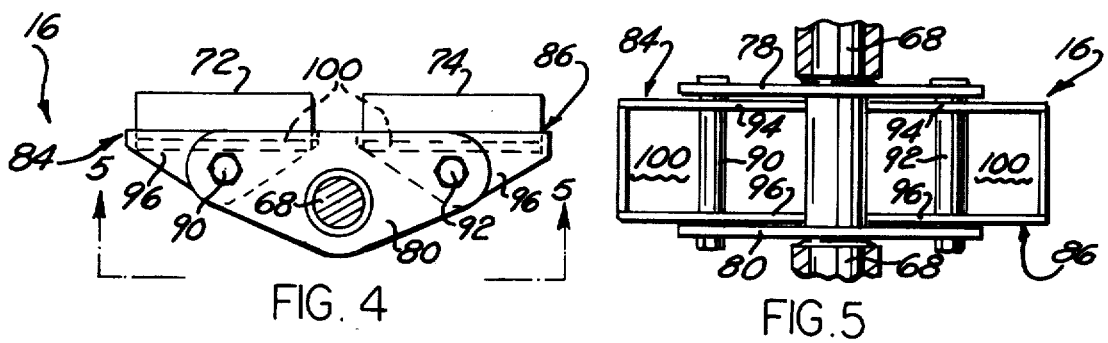
FIG. 4
FIG. 5

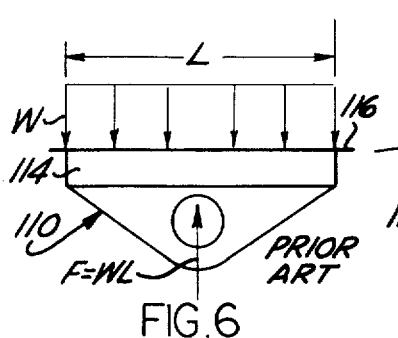
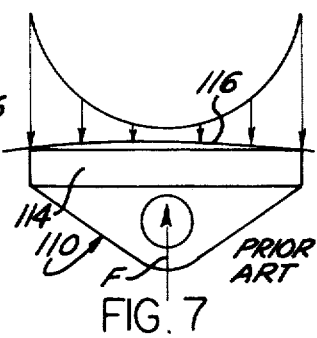
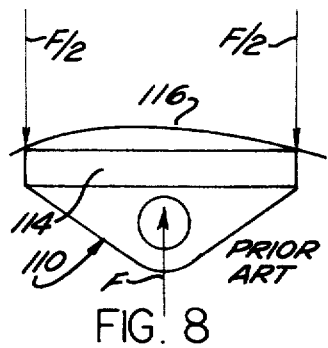
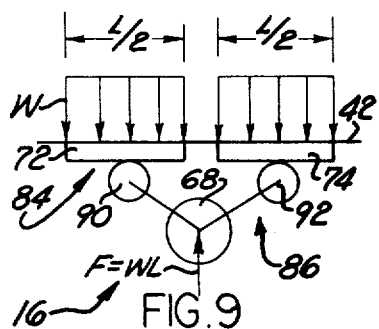
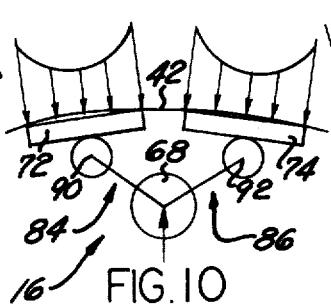
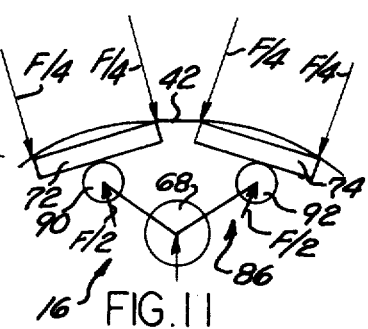
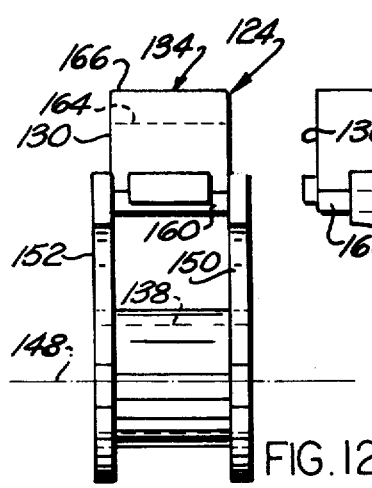
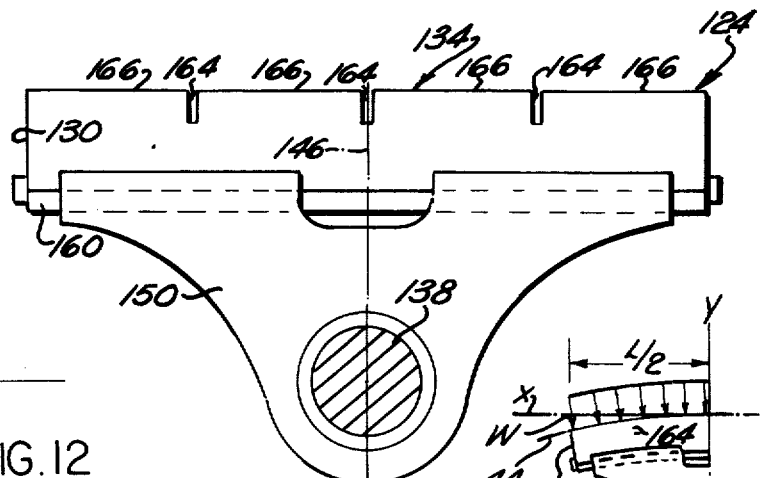
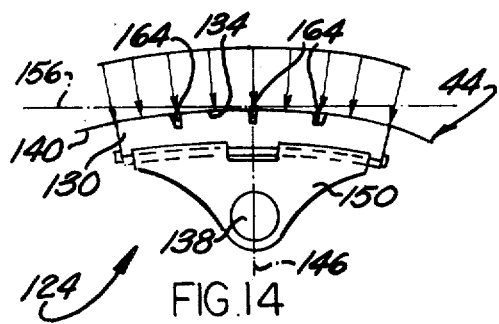
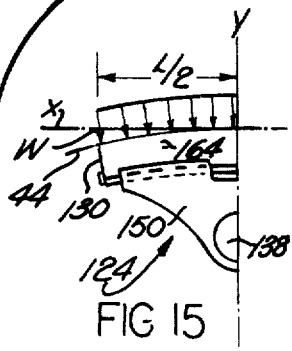

BOOM SLIDER ASSEMBLY

This application is a continuation of application Ser. No. 397,294 filed Sept. 14, 1973 now abandoned which is itself a divisional of application Ser. No. 240,759 filed Apr. 3, 1972, which is a continuation of application Ser. No. 29,408, filed Apr. 17, 1970 and which has issued as U.S. Pat. No. 3,782,790.

This invention relates to an improved slider assembly which tends to promote the uniform distribution of bearing loads between the slider assembly and a supported boom section.

Telescopic booms commonly include slider assemblies which support sections of the boom for movement relative to each other. A known slider assembly includes a single slider pad which, upon deflection of the boom, is subjected to relatively large loads at its leading and trailing end portions. The relatively large load at one end portion of the slider assembly can, under extreme conditions, approach as much as fifty per cent of the load carried by the slider assembly. This concentration of the load at the ends of the slider assembly tends to reduce the load carrying capacity of the boom by forming undesirable stress concentrations in the boom. In addition, the concentration of the load at the ends of the slider assembly promotes wearing of the slider assembly.

Accordingly, it is an object of this invention to provide a new and improved slider assembly for use in supporting sections of a boom and which tends to promote the uniform distribution of bearing loads between the slider assembly and an associated boom section upon application of an operating load to the boom.

Another object of this invention to provide an articulated slider assembly for use in supporting relatively movable sections of a boom and which compensates for deflection of the boom under the influence of an operating load to thereby reduce stress concentrations in the boom and enable the boom to carry a greater load.

Another object of this invention is to provide a new and improved slider assembly for use in supporting sections of a boom for relative movement wherein the slider assembly includes a rocker member which is adapted to be pivotally connected with one section of the boom for pivotal movement relative thereto, first and second slider members which are pivotally connected to the rocker member at spaced apart locations for pivotal movement relative thereto, and first and second pad means mounted on the slider members for engaging a supported section of the boom at spaced apart locations and wherein the rocker member and the first and second slider members are pivotal relative to the supported section of the boom to at least partially compensate for deflection of the boom upon application of a load thereto.

Another object of this invention is to provide a new and improved slider assembly for use in supporting relatively movable sections of a boom and which has a structural deflection curve which matches the deflection curve of a slidably engaged section of the boom to thereby provide for the transmission of a uniform bearing load between the slider assembly and the engaged boom section.

Another object of this invention is to provide new and improved boom assembly and includes a slider means for facilitating relative movement between sections of the boom assembly and wherein the slider means has a flexural rigidity such that upon application of a predetermined operating load to the boom assembly a deflection curve for a section of the boom assembly which is slidably engaged by the slider means is the same as a deflection curve for the slider means to thereby provide for the transmittal of a uniform bearing load between the slider means and the section of the boom assembly.

Another object of this invention is to provide a new and improved boom assembly in accordance with the next preceding object and wherein the slider means includes a pad which slidably engages the section of the boom, the pad being divided into a plurality of sections which are movable relative to each other upon deflection of the section of the boom assembly under the influence of an operating load to thereby facilitate maintenance of the surface of the slider pad sections in abutting engagement with the section of the boom assembly upon deflection of the boom assembly.

Another object of this invention is to provide a new and improved slider assembly for supporting sections of a boom for relative movement wherein the slider assembly includes a pad which is mounted on a support assembly and is adapted to be disposed in abutting engagement with a section of the boom and wherein the slider pad includes means for dividing the pad into a plurality of sections to enable relative movement to occur between the sections of the slider pad upon deflection of the boom to thereby facilitate maintenance of the surfaces of the slider pad sections in abutting engagement with the section of the boom upon deflection of the boom.

These and other objects and features of the invention will become more apparent upon a consideration of the following description taken in connection with the accompanying drawings wherein:

FIG. 1 is an illustration of a known crane vehicle having a boom assembly;

FIG. 3 is an enlarged illustration of an articulated slider assembly constructed in accordance with the present invention and utilized in the boom assembly of FIG. 2 to support one section of the boom assembly for movement relative to another section of the boom assembly;

FIG. 4 is an elevational view, taken generally along the line 4—4 of FIG. 3, illustrating the relationship between a rocker arm and a pair of slider block assemblies which are pivotally mounted on the rocker arm;

FIG. 5 is a plan view, taken generally along the line 5—5 of FIG. 4, further illustrating the relationship between th slider block assemblies and the rocker arm;

FIG. 6 is a schematic illustration of a known slider assembly in a lightly loaded condition in which a uniform bearing load is carried by the slider assembly and there is substantially no deflection of a boom with which the slider assembly is associated;

FIG. 7 is a schematic illustration depicting a tendency for the bearing load to concentrate at end portions of the known slider assembly of FIG. 6 upon deflection of the boom under the influence of an operating load;

FIG. 8 is a schematic illustration depicting an extreme loading condition in which the boom has been deflected to such an extent that the entire bearing load is concentrated at opposite end portions of the known slider assembly;

3

Figure 2:
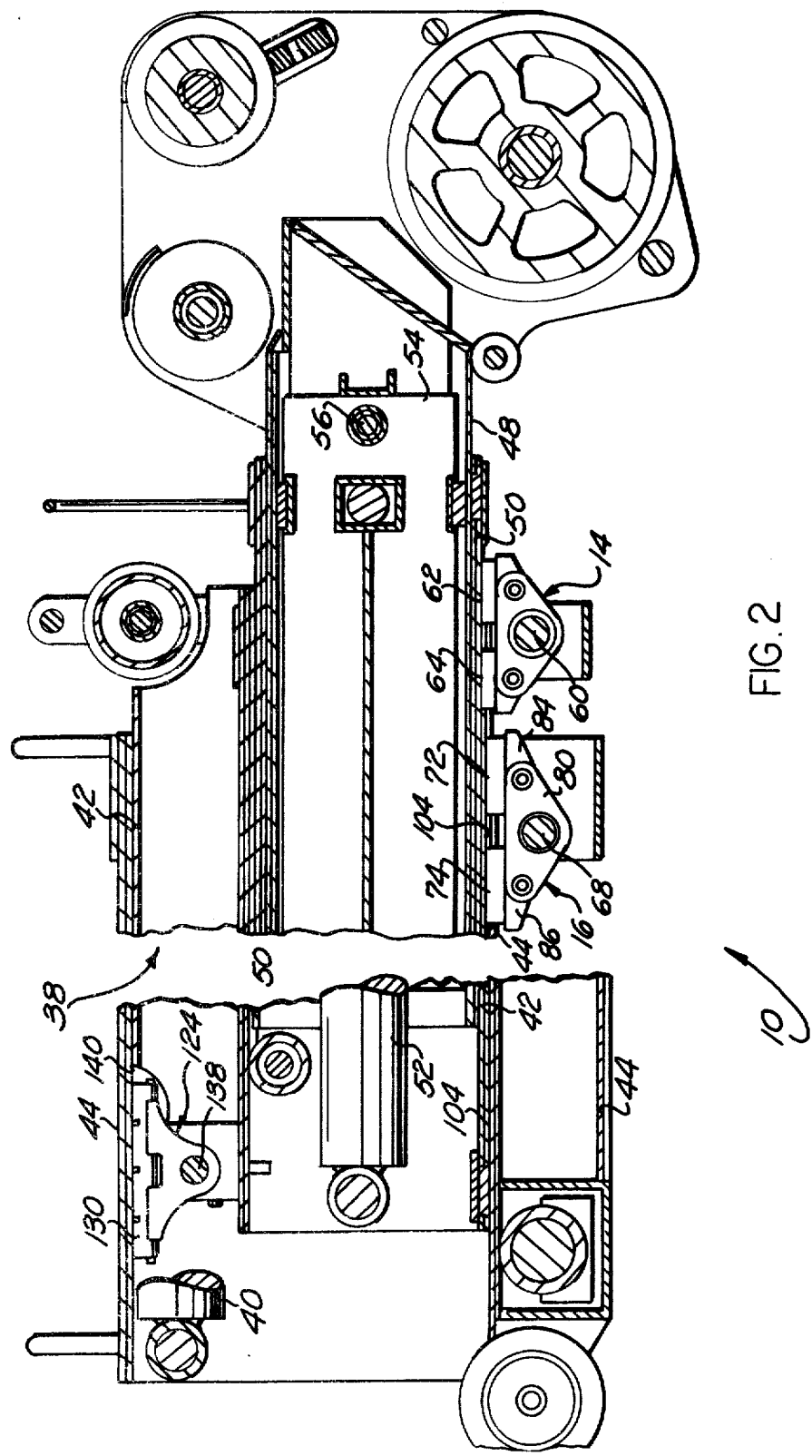
FIG. 2 is an enlarged fragmentary sectional view of the boom assembly of the crane vehicle of FIG. 1.

FIG. 9 is a schematic illustration of the articulated slider assembly of FIG. 3 in a lightly loaded condition with substantially no deflection of an associated boom section and corresponds to the operating condition shown in FIG. 6 for the known slider assembly;

FIG. 10 is a schematic illustration of the articulated slider assembly in a loaded condition in which there is some deflection of the boom and corresponds to the operating condition shown in FIG. 7 for the known slider assembly;

FIG. 11 is a schematic illustration of the articulated slider assembly an extreme loading condition in which there is substantial deflection of the boom and corresponds to the operating condition shown in FIG. 8 for the known slider assembly;

FIG. 12 is an end view of a spring type slider assembly forming another embodiment of the present invention;

FIG. 13 is an elevational view of the spring type slider assembly of FIG. 12;

FIG. 14 is a schematic illustration depicting the matching deflection curves for the spring type slider assembly of FIGS. 12 and 13 and an associated boom section; and FIG. 15 is a schematic illustration depicting the manner of considering half of the spring type slider assembly as a cantilevered beam for purposes of calculating deflection of the spring type slider assembly.

A slider assembly constructed in accordance with the present invention increases the load carrying capacity of a boom assembly by compensating for deflection of a supported boom section in a manner which tends to reduce stress concentrations in the boom section. An articulated slider assembly accomplishes this by providing for independent pivotal movement or rotation of slider block assemblies upon deflection of the supported boom section. In another embodiment of the invention, a spring type slider assembly has a flexural rigidity such that the curve of deflection of the spring type slider assembly matches the curve of deflection of the surface of a slidably engaged boom section. Therefore the configuration of a support surface for the slider assembly changes with deflection of the associated boom section in such a manner that a uniform bearing load is transmitted between the slider assembly and the boom section. To further promote the transmittal of a uniform bearing load between the spring type slider assembly and the boom section, the slider assembly includes a slider pad which is divided into a plurality of sections which are movable relative to each other upon the occurrence of deflection in the boom section to thereby facilitate maintenance of the support surface of the slider pad in abutting engagement with the boom section as the boom section deflects. It is contemplated that the separate embodiments of the slider assemblies could be combined into a single slider assembly having features of each of the separate embodiments.

Although a slider assembly constructed in accordance with the present invention can be utilized in other boom assemblies in many different types of environments, a boom assembly 10 having articulated slider assemblies 14 and 16 (FIG. 2) constructed in accordance with the present invention, is shown in association with a crane vehicle 18 (FIG. 1). The boom assembly 10 is supported on a base frame 22 for rotation relative to a vehicle frame 24 by a turntable 26. An operator in a cab 28 controls the operation of a power plant 30 to effect rotational movement of the boom

4 assembly 10 relative to the frame 24 of the vehicle. Suitable controls are provided in the operator's cab 28 for effecting upward pivoting movement of the boom 10 from the illustrated over-the-road or transport position of FIG. 1. In addition, controls, are provided in the cab 28 to operate a winch assembly 32 to lift a load with a hook 33. The crane type vehicle 18 is driven over-the-road by a driver in a cab 34 which is mounted on a forward portion of the frame 24.

The boom assembly 10 is operated in a known manner from the retracted position of FIG. 2 to an extended position (not shown) by increasing the telescopic relationship between a plurality of relatively movable sections 38 of the boom assembly. Thus, a first piston and cylinder assembly 40 is extendable to move a first intermediate section 42 of the boom assembly 10 outwardly relatively to a base section 44 of the boom assembly. A fly or outermost section 48 of the boom assembly 10 is moved outwardly relative to the first intermediate section 42 and a second intermediate section 50 by extending a section piston and cylinder assembly 52 with a coupling member 54 connected to the fly section 48. The second intermediate section 50 and fly section 48 are then extended relative to the first intermediate section 42 and base section 44 of the boom assembly 10 by disconnecting a pin 56, retracting the piston cylinder assembly 52 to withdraw the coupling member 54 and then connecting the coupling member to the intermediate section 50 with the pin 56. The manner of extending the boom assembly 10 is more fully explained in U.S. Pat. No. 3,368,696 to Johnston et al and, for purposes of avoiding prolixity of description, will not be further described herein.

The articulated slider assemblies 14 and 16 at least partially support the intermediate boom sections 42 and 50 in a load carrying position and enable the sections to be moved axially relative to each other. Thus the articulated slider assembly 14 is pivotally mounted on a support shaft 60 connected to the first intermediate section 42 and has slider pads 62 and 64 disposed in sliding engagement with an outer surface of the second intermediate section 50 to support the boom section 50 for sliding movement relative to the boom section 42. Similarly, the articulated slider assembly 16 is pivotally mounted on a support shaft 68 connected with the base section 44 and includes slider pads 72 and 74 disposed in sliding engagement with an outer surface of the first intermediate boom section 42 to support the first intermediate boom section for sliding movement relative to the base section 44.

The articulated slider assembly 16 includes a pair of rocker or base members 78 and 80 (see FIGS. 3 through 5) which are fixedly interconnected and pivotally mounted on the suport shaft 68. A pair of spaced apart slider block assemblies 84 and 86 are mounted between the rocker members 78 and 80 and are independently pivotal about parallel support pins 90 and 92 which extend between the rocker members 78 and 80. The support pins 90 and 92 are spaced equal horizontal and vertical distances from the support shaft 68. The two slider block assemblies 84 and 86 are substantially identical in construction and each includes a pair of slider arms 94 and 96 which extend parallel to each other and to the rocker members 78 and 80. The slider pads 72 and 74 are mounted on support plates 100, one of which extends between and fixedly interconnects each of th pairs of slider arms 94 and 96.

The articulated slider assembly 16 is rotatably mounted on the support shaft 68 which is in turn fixedly connected to the boom section 44. The slider pads 72 and 74 extend into abutting engagement with an outer surface 104 (see FIG. 2) of the first intermediate section 42. The articulated slider assembly 14 is constructed in the same manner as previously explained for the articulated slider assembly 16 and therefore will not be described in detail. However, it should be noted that the articulated slider assembly 14 is pivotally mounted on the first intermediate boom section 42 by the support shaft 60 with the slider pads 62 and 64 in engagement with the second intermediate boom section 50. Of course other slider assemblies, which may or may not be articulated, are provided to assist in supporting the boom sections 42, 44, 48 and 50 for movement relative to each other.

A known type of slider assembly 110 is shown in FIG. 6. The slider assembly 110 includes a slider pad 114 having a surface area which is equal to the combined surface areas of the two slider pads 72 and 74 of the articulated slider assembly 16. The slider pad 114 is disposed in abutting engagement with an outer surface of a lightly loaded boom section indicated schematically at 116. There is little or no deflection of the boom section 116 when it is lightly loaded as shown in FIG. 6. Therefore a relatively small and uniform bearing load, designated W in FIG. 6, is applied to each unit of length of the slider pad 114. The total downward load on the slider pad 114 is equal to the product of the load W per unit of length multiplied by the length L of the slider pad. This downward load is balanced by an upward reaction force designated F in FIG. 6.

As the load on the boom section 116 increases, the boom section tends to deflect in a manner shown schematically in FIG. 7. As the boom section 116 deflects it curves or bows so that the bearing load tends to become concentrated toward the leading and trailing end portions of the known slider assembly 110 and is no longer applied uniformly throughout the length L of the slider assembly. As the operating load on the boom section 116 is further increased, the curve of deflection for the boom section increases and the loading approaches the extreme condition shown in FIG. 8 wherein half of the load is concentrated at one end portion of the slider assembly and the other half of the load is concentrated at the other end portion of the slider assembly. As the load on the slider assembly 110 approaches the condition shown in FIG. 8, stress concentrations in the boom section 116 increase. Of course, the increasing stress concentrations in the boom section 116 reduce the load carrying capacity of the boom section. In addition, the concentrated forces on the leading and trailing end portions of the slider pad 114 tend to promote a rapid wearing of the slider pad.

The articulated slider assemblies 14 and 16 compensate for deflection of the associated boom sections to reduce stress concentrations in the boom sections and thereby increase the load carrying capacity of the boom sections. To accomplish this, the articulated slider assemblies 14 and 16 tend to promote a more uniform distribution of the bearing loads between the slider assemblies and the associated boom sections upon loading of the boom sections. This is illustrated schematically in FIGS. 9 through 11 for the slider assembly 16. However, it should be understood that the slider assembly 14 operates in much the same manner to promote a more uniform load distribution upon deflection of the second intermediate boom section 50.

When the first intermediate boom section 42 is in a normal or lightly loaded condition (FIG. 9) there is little or no deflection of the boom section and a uniform load W per unit length is transmitted from the boom section 42 to the articulated slider assembly 16. Since the slider pads 72 and 74 have the same combined length as the slider pad 114, the total reaction force F is the same for the articulated slider assembly 16 as for the known slider assembly 110 if the uniform load W per unit length is the same. As the operating load on the boom section 42 is increased, the total bearing load and reaction force F will increase and the boom section will tend to deflect in the manner illustrated schematically in FIG. 10. As the curve of deflection 40 by the boom section 42 increases with a corresponding increase in the operating load on the boom assembly 10, the bearing load tends to become concentrated toward the opposite end portions of the slider pads 72 and 74 (FIG. 10). The curve of deflection of the boom section 42 is increased with further increases in the operating load and the loading of the slider pads 72 and 74 approaches the extreme condition shown schematically in FIG. 11.

The articulated slider assembly 16 compensates for the deflection of the boom section 42 to decrease stress concentrations in the boom section to a level which is lower than is obtainable with the known slider assembly 110 under the same operating conditions. Of course, decreasing the stress concentrations in the boom section 42 increases the load carrying capacity of the boom section. The articulated slider assembly 16 decreases the level of the stress concentrations in the boom section 42 by allowing independent pivoting movement of the slider block assemblies 84 and 86 to occur relative to the rocker arms 78 and 80 upon deflection of the boom section 42. This pivoting movement enables the bearing load transmitted between the articulated slider assembly 16 and boom section 42 to tend to become concentrated in four areas at the end portions of the two slider pads 72 and 74 (FIG. 10). As was previously explained, the bearing load transmitted between the known slider assembly 110 and boom section 116 tends to become concentrated in two areas at the end portions of the slider pad 114 (FIG. 7). Therefore if equal total loads are applied to the two slider assemblies, the magnitude of the load concentrated at each of the two end portions of the known slider assembly 110 is greater than the magnitude of the load concentrated at each of the four end portions of the articulated slider assembly 16.

The compensating action of the articulated slider assembly 16 is perhaps best seen by a comparison of an extreme loading condition for the known slider assembly 110 (see FIG. 8) and the articulated slider assembly 16 (see FIG. 11). If it is assumed that an equal total load F is applied to each of the slider assemblies, under conditions of extreme deflection one half of the total load (F/2) tends to be transmitted between the supported boom section and each of the opposite end portions of the known slider assembly 110. However, under conditions of extreme deflection only one fourth of the total load (F/4) tends to be transmitted between the supported boom section and each of the opposite end portions of the slider pads 72 and 74 of the articulated slider assembly 16. The two pivot axes 90 and 92 are equally spaced from the axis of the support shaft 68 so that counterbalancing torque forces applied to the rocker arms 78 and 80 by equal loads on the slide block assemblies 84 and 86.

From the foregoing it can be seen that the articulated slider assembly 14 generates a greater load bearing capacity in a supported boom section due to pivotal movement or rocking of the slider block assemblies 84 and 86 upon deflection of the supported boom section. This pivotal movement of the slider block assemblies 84 and 86 reduces the load which is concentrated at the leading and trailing end portions of the slider pads 72 and 74 to thereby decrease the stress concentrations in the supported boom section 42. It should be understood that although the articulated slider assembly 14 has been shown in association with a specific boom assembly 10, the articulated slider assembly could be utilized with other types of boom assemblies.

A spring type slider assembly 124 (FIGS. 12 and 13) forms another specific embodiment of the present invention. The spring type slider assembly 124 enables a uniform load per unit length of the slider assembly to be transmitted between the slider assembly and a supported boom section even though the boom section deflects under the influence of an operating load. To this end the spring type slider assembly 124 has a structural deflection curve which matches the deflection curve of the supported boom section in an area where the slider assembly engages the boom section. Since the slider assembly 124 and the supported boom section deflect to the same extent, a slider pad 130 deflects with the boom section to maintain a support surface 134 of the slider pad in uniform pressure engagement with the supported boom section.

The spring type slider assembly 124 is pivotally mounted on a support shaft 138 (FIG. 2) on the first intermediate boom section 42. The slider pad 130 is disposed in sliding engagement with an inner surface 140 of the base section 44 of the boom assembly 10. Upon operation of the piston and cylinder assembly 40, the first intermediate boom section 42 and spring type slider assembly 124 are moved longitudinally along the boom section 44.

When an operating load is applied to the boom assembly 10, the boom section 44 tends to deflect under the influence of the operating load. The curve of deflection of the spring type slider assembly 124 matches the deflection curve of the boom section 44. Therefore upon application of a load to the boom section 44, the spring type slider assembly 124 deflects to the same extent that the boom section 44 deflects. This results in a uniform bearing load being transmitted between the spring type slider assembly 124 and the boom section 44 in the manner illustrated schematically in FIG. 14. It should be noted that the spring type slider assembly 124 substantially eliminates the concentration of the bearing loads at the leading and trailing end portions of the slider assembly, in the manner which occurs with the known slider assembly 110 (see FIGS. 7 and 8).

The spring type slider assembly 124 is constructed so that when a predetermined operating load is applied to the boom assembly 10, the curve of deflection of the spring type slider assembly 124 is the same as the curve of deflection of the portion of the boom section 44 which is engaged by the spring type slider assembly 124. This construction of spring type slider assembly 124 is arrived at by first determining the curve of deflection of the boom section 44 and then designing the spring type slider assembly to have the same curve of deflection. The curve of deflection of the boom section 44 is determined by applying a series of predetermined loads to the boom assembly 10 and measuring the deflection of a plurality of points on the boom section 44. Alternatively, the deflection of the boom section 44 can be calculated by use of the method of superposition, i.e. the well known method of obtaining the deflection at any point by summing the deflections produced at this point by separate loads applied to the boom assembly. Of course, the calculated configuration of the boom deflection curve can be readily checked experimentally by merely applying a predetermined load to the boom assembly 10 and measuring the actual deflection.

Once the deflection curve for the boom section 44 has been either calculated or measured, the spring type slider assembly 124 is designed by equating its deflection equation to the known curve of deflection for the boom section. The equation for the curve deflection of the spring type slider assembly 124 may be determined by considering the spring type slider assembly as having two halves forming cantilevered beams. This is illustrated schematically in FIG. 15 wherein a half of the slider assembly 124 extending to the left of a plane 146 through the center of slider assembly is shown deflected under a uniform load of W lbs. per unit length. The plane 146 extends perpendicular to the support surface 134 of the spring type slider assembly 124 when it is in the normal condition of FIG. 13 and through an axis 148 of rotation of a pair of fixedly interconnected rocker arms 150 and 152 of the spring type slider assembly 124 (see FIGS. 12 and 13).

The curve of deflection for each half section of the slider assembly 124 (see FIG. 15) is represented by the well known cantilevered beam equation:

$$Y = \frac{WX^2}{24EI}(X^2 + 6(L/2)^2 - 4(L/2)X).$$

In this equation the deflection $Y$ at any section located a distance $X$ from the plane 146 is defined as being positive in a downward direction as viewed in FIG. 14. Since the deflection $y$ of the boom section 44 at any given section of the slider assembly 124 has been determined in the manner previously described, the matching deflection of the section of the spring type slider assembly 124 at this location is known. Of course, the uniformly distributed load of W lbs. per unit length over the total length L of the slider assembly 124 can also be determined for a given operating load. Therefore, the deflection equation can be solved for the flexural regidity (EI) of any given section of the spring type slider assembly 124. (E being Young's modulus of elasticity for the material of the slider assembly and I being equal to the moment of inertia of the cross sectional area of the slider assembly with respect to the neutral axis at a selected location X.)

In making the determination of the flexural rigidity (EI) of the spring type slider assembly 124 at any section along a plane extending parallel to the plane 146, the flexural rigidity of the entire cross section of the spring type slider assembly 124 should be considered. Thus, the flexural rigidity of the slider arms 150 and 152, slider pad support plate 160, and the slider pad 138 should be considered. The geometry of the design for the spring type slider 124 and the material utilized in making up the various components of the spring type slider 124 is determined by manufacturing considerations as long as each section of the spring type slider assembly 124 has the required structural rigidity.

To further promote the transmittal of a uniform bearing load between the spring type slider assembly 124 and the boom section 44, the slider pad 130 is divided into a plurality of sections by slots 164 which extend transversely of the slider path in a direction parallel to the axis of rotation 148 of the slider assembly 124. Thus, the bearing surface 134 of the slider pad 130 is divided into a plurality of rectangular sections 166 of equal area. Upon deflection of the spring type slider assembly 124, each of the sections of the slider pad 130 tend to move somewhat relative to each other to maintain the surface areas 166 in uniform pressure engagement with the inner surface 140 of the boom section 44 (see FIG. 14). Of course, this causes the slots 164 to be deformed by a widening of their outer end portions from the normal condition shown in FIG. 13 upon a bending of the boom section 44 and slider assembly 124 in a manner illustrated schematically in FIG. 14. Of course if the slider assembly 124 was associated with a boom section which deflected upwardly rather than downwardly (as viewed in FIG. 14), the sections 166 of the slider pad 130 would tend to move toward each other with a resulting decrease in the width of the outer end portions of the slots 164.

In another specific embodiment of the invention, the slider block assemblies 84 and 86 of the articulated slider assembly 16 are designed so that their curve of deflection matches the curve of deflection of the supported boom section. Of course, the structural geometry and material composition of the slider block assemblies 84 and 86 are determined in the manner previously explained for the spring type slider assembly 124 so that the flexural rigidity of the slider block assemblies 84 and 86 is such as to result in the desired matching curves of deflection. Of course, the slider pads 72 and 74 could be divided into a plurality of sections by slots, similar to the slots 164, to further promote the transmittal of a uniform bearing load between the slider block assemblies 72 and 74 and the supported beam section 42.

In view of the foregoing description, it can be seen that the slider assemblies 16 and 124 reduce stress concentrations in a boom section by promoting the uniform distribution of bearing loads transmitted between the slider assemblies and the boom section. The articulated slider assembly 16 reduces stress concentrations in the boom by rotation of the slider block assemblies 84 and 86 relative to the rocker arms 78 and 80 upon deflection of the supported boom section to thereby compensate for this deflection. The spring type slider assembly 124 has a structural deflection curve which matches the deflection curve of the boom section 44 in the area where the slider assembly 124 engages the boom section. Since the structural deflection curve of the spring type slider assembly 124 matches the structural deflection curve of the boom section 44, a uniform bearing load is transmitted between the slider pad 130 and the boom section 44 throughout the entire length of the spring type slider assembly 124. When the slider block assemblies 84 and 86 are designed so that their structural deflection curves match the structural deflection curve of the supported boom section, a uniform load is transmitted between the slider pads 72 and 74 of the articulated slider assembly 16 and the supported boom section 42 upon deflection of the boom section.

Having thus described specific preferred embodiments of the invention, the following is claimed:

1. A boom assembly comprising a first boom section having a longitudinal axis and a predetermined longitudinal curve of deflection upon application of a predetermined load to said first boom section, a second boom section operatively connected with said first boom section, means for effecting relative movement between said boom sections to thereby extend and retract said boom assembly, means for applying the predetermined load to said first boom section to effect deflection of said first boom section to a condition in which the longitudinal axis of said first boom section has a curvature matching the predetermined longitudinal curve of deflection for said first boom section, and slider means pivotally mounted on said second section of said boom assembly for movement about a transverse axis and having a surface of a predetermined area disposed in abutting engagement with said first section of said boom assembly for transmitting a uniform bearing load throughout the area of said surface to an engaged surface area of said first boom section to facilitate relative movement between said sections of said boom assembly, said slider means having a deflection $Y$ equal to the deflection of said first boom section at any transverse section located a distance $X$ from a plane extending along the transverse axis about which said slider means is mounted for pivotal movement and perpendicular to said surface, said deflection Y being defined by the following equation:

$$Y = \frac{WX^2}{24EI}(X^2 + 6(L/2)^2 - 4(L/2)X)$$

in which
- $W=$ uniform bearing load per unit of length of said slider means
- $E=$ Young's modulus of elasticity for the material of the slider assembly
- $I=$ the moment of inertia of the cross sectional area of the slider
- $L/2=$ the distance from said plane to one end of said slider means said slider means including a slider pad disposed in abutting engagement with said first section of said boom assembly and having a central axis which extends generally parallel to the central axis of said first boom section, said slider pad including means for dividing said slider pad into a plurality of sections having outer surfaces disposed in engagement with said first section of said boom assembly to enable relative movement to occur between said sections of said slider pad upon deflection of said boom assembly under the influence of an operating load to thereby facilitate maintenance of the surfaces of said slider pad sections in abutting engagement with said first section of said boom assembly upon deflection of said boom assembly, said means for dividing said slider pad into a plurality of sections includes means for defining a plurality of slots each of which has a longitudinal axis which extends across said slider pad in a direction transverse to the central axis of said slider pad, each of said slots having a width which is less than the width of a section of said slider pad as measured along the central axis of said slider pad.

2. A boom assembly comprising a first boom section, a second boom section operatively connected with said first boom section, means for effecting relative movement between said boom sections to thereby extend and retract said boom assembly, means for applying an operating load to said boom assembly which tends to effect longitudinal deflection of said boom assembly, and slider means mounted on said second section of said boom assembly and disposed in engagement with said first section of said boom assembly for facilitating relative movement between said sections of said boom assembly, said slider means having a flexural rigidity such that upon application of a predetermined operating load to said boom assembly a deflection curve for said first section of said boom assembly in a direction extending longitudinally of said boom assembly is the same as a deflection curve for said slider means in a direction extending longitudinally of said boom assembly to thereby provide for the transmittal of a uniform bearing load between said slider means and said first section of said boom assembly, said slider means including a slider pad disposed in abutting engagement with said first section of said boom assembly and having a central axis which extends generally parallel to the central axis of said first section of said boom assembly, said slider pad including means for dividing said slider pad into a plurality of sections having outer surfaces disposed in engagement with said first section of said boom assembly to enable relative movement to occur between said sections of said slider pad upon deflection of said boom assembly under the influence of an operating load to thereby facilitate maintenance of the surfaces of said slider pad sections in abutting engagement with said first section of said boom assembly upon deflection of said boom assembly, said means for dividing said slider pad into a plurality of sections includes means for defining a plurality of slots each of which has a longitudinal axis which extends across said slider pad in a direction transverse to the central axis of said slider pad, each of said slots having a width which is less than the width of a section of said slider pad as measured along the central axis of said slider pad.

3. A boom assembly comprising a first boom section, a second boom section operatively connected with said first boom section, means for effecting relative movement between said boom sections to thereby extend and retract said boom assembly, means for applying an operating load to said boom assembly which tends to effect longitudinal deflection of said boom assembly, and slider means mounted on said second section of said boom assembly and disposed in engagement with said first section of said boom assembly for facilitating relative movement between said sections of said boom assembly, said slider means including a slider pad disposed in abutting engagement with said first section of said boom assembly and having a central axis which extends generally parallel to the central axis of said first section of said boom assembly, said slider pad including means for dividing said slider pad into a plurality of sections having outer surfaces disposed in engagement with said first section of said boom assembly to enable relative movement to occur between said sections of said slider pad upon deflection of said boom assembly under the influence of an operating load to thereby facilitate maintenance of the surfaces of said slider pad sections in abutting engagement with said first section of said boom assembly upon deflection of said boom assembly, said means for dividing said slider pad into a plurality of sections includes means for defining a plurality of slots each of which has a longitudinal axis which extends across said slider pad in a direction transverse to the central axis of said slider pad, each of said slots having a width which is less than the width of a section of said slider pad as measured along the central axis of said slider pad.

* * * * *